Oct. 3, 1939.  I. TILSON  2,175,006
MUSICAL CLOSURE AND HOLDER
Filed Nov. 30, 1936
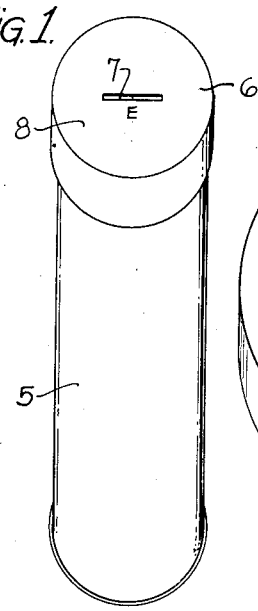
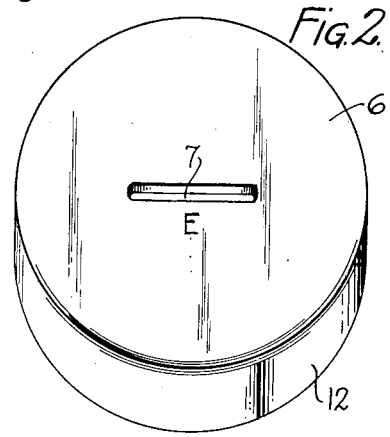
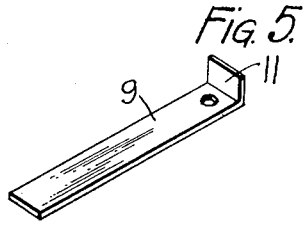
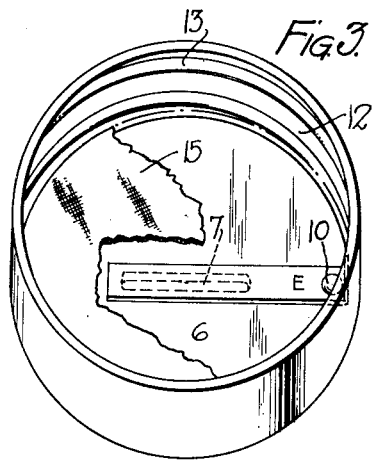
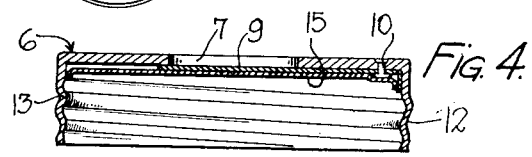
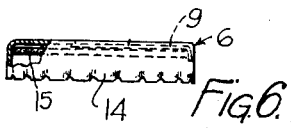
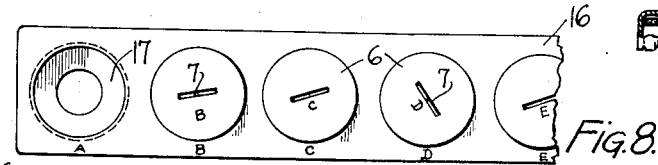
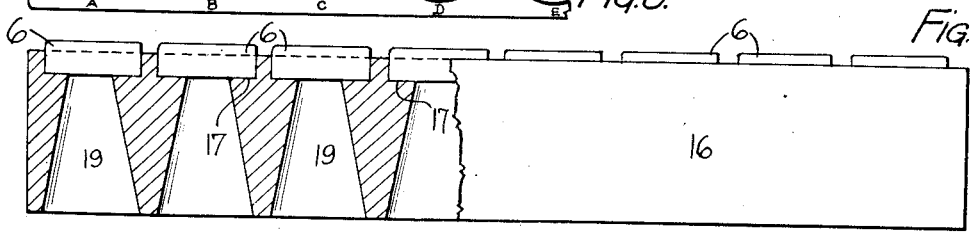
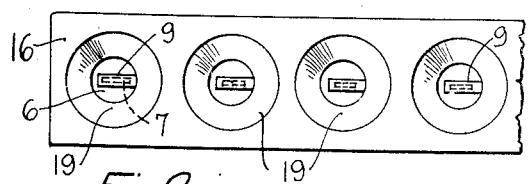
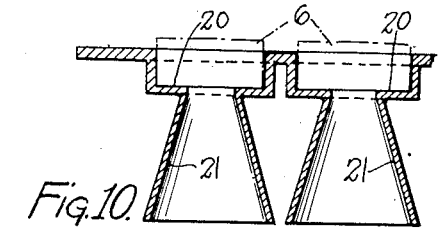
INVENTOR.
IRVING TILSON
BY John J. Lynch
ATTORNEY.

Patented Oct. 3, 1939

2,175,006

UNITED STATES PATENT OFFICE 2,175,006

MUSICAL CLOSURE AND HOLDER

Irving Tilson, Brooklyn, N. Y.

Application November 30, 1936, Serial No. 113,359

2 Claims. (Cl. 46—180)

This invention relates to novelties and in particular to one which is educational, provides an incentive for the sale of merchandise and affords amusement to the user thereof.

An object of the invention is to provide a means for stimulating the sales of a commodity that, for instance, is sold particularly to children so that the buyer will be interested in making a collection of novelty devices which can be assembled in a single holder for use in playing musical tunes, these novelty devices being made a part of, or constituting a closure member in which the commodity is sold, for instance, ice cream.

The ice cream is put up in a receptacle having a cap cover or closure member, ice cream being cited only as an illustration of a commodity that would appeal particularly to children. The closure or cap is provided with a reed which when blown will produce a musical note. The dealer will be provided with a number of different closures on his different receptacles, so that a child will be induced to buy a number of the receptacles containing the ice cream or pop or the like in order to procure a complete set of the receptacle caps. It is possible to obtain a cap for each note of the musical scale, so that when the child has a complete set he or she may receive from the dealer, a holder for the caps which will arrange them in proper order so that a complete musical tune can be played. In this manner, the child is educated to distinguish tunes, notes and also to arrange the notes in the proper order of sequence so that musical melodies can be played or practiced. While the device will appeal largely to children, its sale in connection with commodities that would be useful only to the adult is evident in that the parents would save the closures or caps to give to children and thus create a desire for the complete set of caps in order to obtain the instrument or holder in which they would have to be held in order to play a complete tune through their use. Also, while essentially the entire set are contemplated for a musical instrument it is evident that each cap with its musical note or whistle will afford amusement to children.

A still further object of the invention is to utilize the existing cap constructions whether they be of the threaded type for screw engagement with a container or of the crimped edge type as used on soda or beer bottles, in order that the cost of the product need not be increased because of the novel construction. Also the construction of the device is extremely simple and requires no instructions for its use.

Changes and variations may be made in the construction shown and described without departing from the spirit of the invention or sacrificing its chief advantages; hence such invention is not to be confined to the exact structure shown in the drawing, in which;

Figure 1 is a view in perspective of a receptacle having a musical cap employed thereon as a closure, Figure 2 is an enlarged perspective showing the top of the cap with its slot opening through which air is blown to vibrate a metal reed or strip to produce a musical note, Figure 3 is a view similar to Figure 2 showing the inside of the cap and illustrating the means for holding the musical strip in place as well as the relation thereof with the wind slot in the top of the cap, Figure 4 is a view in cross section showing the use of an inner sealing disk which may be employed in caps or closures attached to liquid receptacles, Figure 5 is a view in perspective of the musical reed or strip employed in the closure member, Figure 6 is a side view of a crimped edge cap in which my musical element may be incorporated, the cork inseal of the cap being partly shown, Figure 7 is a view in side elevation, partly in section of the holder into which the caps are forced so that they may be suitably combined to provide a musical instrument, Figure 8 is a partial plan view of the cap holder as shown in Figure 7, Figure 9 is a part of a bottom view of the holder as illustrated in Figure 7, and Figure 10 is a view in section of one end of a holder which may be molded or cast to provide a receptacle for the caps.

Referring to the drawing in detail, 5 indicates a receptacle in which may be sold any commodity, and which is to be closed by a cover, closure or cap member 6, either force fitted thereon as in paper or fiber containers, or is threaded thereto as in metal caps or frictionally fitted thereto as a crimped edge cap.

To make the cap of value from a sales point, the same is actually a musical note sounding device and is slotted as at 7 at the center of its top face 8 to overlie or be closed by a reed or strip of metal 9 which may be riveted or otherwise secured as at 10 to the underside of the cap top 8. In order to prevent turning of the strip 9, the same may be provided at one end with a turned portion or lip 11 which abuts the flange or apron portion 12 of the cap. This apron is threaded as at 13 in the usual manner to fit on the threaded end of a receptacle, or as illustrated in Figure 6 is crimped as at 14 to provide a friction hold on the receptacle.

The cap is a musical member constituting a closure for a receptacle and as such is entertaining to a child as a whistle which, when blown on, through its closed side 8 produces a single musical note. I have contemplated the use of a single reed or strip which will produce a double note by reversing the passage of air through the slot 7. Each cap 6 is provided with a reed or strip 9 which is tempered or tuned to a different key, the caps of a complete set providing the musical notes of an octave or complete scale so that when a set of caps are in a holder, a musical instrument is provided. The reed or strip as well as the exterior of the cap or closure are provided with a mark or letter as "E" designating the note sounded by the cap when blown through. The cap may be provided with the usual sealing disk or filler 15 for preventing spilling of the contents of a receptacle on which the cap is used. This disk will be removed by the child using the cap and the cap can then be used to blow through.

As the child buys the commodity, and saves the caps from the different containers, he accumulates a set of the caps eventually that will provide a set or octave of all the notes of the scale and upon taking the caps to the dealer will receive a holder for the set. This holder 16 may be made of any suitable material as wood and bored to provide seats 17 into which the caps are force-fitted to rest on the flange seats 18 provided by the boring from the upper surface inwardly of the holder. Adjacent each bore the holder is designated with letters of the note scale so that a correspondingly marked cap can be placed in its proper opening or seat as illustrated in Figures 7 and 8. The seat bores 17 are concentric with tapered openings 19 which are largest at the exit ends and open at one side of the holder 16. These sound passages are for the purpose of magnifying the sound after the manner of a megaphone and one sound passage is provided for each cap. When the caps are properly assembled in the holder 16 as shown in Figure 7, a musical instrument is provided upon which simple tunes and melodies may be played thus providing an educational feature for the child or user.

As shown in Figure 10, the holder may be cast or molded out of any suitable material such as Bakelite or metal and formed to provide seat portions for the caps as at 20 and cone-shaped megaphone openings 21 integral therewith. As the caps are somewhat yieldable in their flange portions they can be pressed into the seat portions of the holder without difficulty and will be frictionally held therein in any arrangement desired. It is of course understood that any number less or greater than eight caps can be employed in any special holder to fit the number used. That is, four caps could be used in a holder having four cap openings etc., and the holder could be such that it would hold different kinds of caps, that is threaded or crimped caps perhaps from different receptacles of the same manufacturer.

It is evident therefore that I have provided a musical closure and holder therefor that constitutes an educational musical novelty as well as a manufacturing novelty and one that will provide an incentive for sales of the commodity and also afford amusement to children and be entertaining and instructive.

The invention is not to be restricted to the precise details of construction shown since changes and alterations may be made therein without departing from the scope of the invention or sacrificing the advantages derived from its use.

What I claim is:

1. In combination, a holder and a cylindrically shaped closure cap having an opening and a reed mounted adjacent the opening thereof, said holder having a plurality of axially disposed apertures, said apertures having an enlarged opening portion on the external surface of said holder for carrying the sound away from said holder, the opposite end of the apertures having cylindrically shaped walls for receiving said cylindrically shaped closure cap and a shoulder positioned between said apertures for preventing the cap from passing beyond said shoulder whereby the sound from said reed may pass through said enlarged openings.

2. In combination, a holder and a cylindrically shaped closure cap having an opening and a reed mounted adjacent the opening thereof, said holder comprising a flat section having a plurality of circular disposed cylindrical depressions for receiving said closure cap, each of said depressions having a centrally located aperture, a plurality of truncated hollow cone-like sections connected with the lower surface of said cylindrically shaped depressions whereby the sound produced by said reed will pass through said apertures in said cylindrically shaped depressions through the hollow truncated sections affixed to the lower surface thereof.

IRVING TILSON.